United States Patent [19]

Foster et al.

[11] 4,293,807

[45] Oct. 6, 1981

[54] STEPPING MOTOR CONTROL APPARATUS

[75] Inventors: George W. Foster, Middleton, Wis.; Alain M. Bonneyrat, St-Martin-du-Tertre, France

[73] Assignee: Gilson Medical Electronics (France), Villiers-le-Bel, France

[21] Appl. No.: 89,191

[22] Filed: Oct. 29, 1979

[30] Foreign Application Priority Data

Nov. 2, 1978 [FR] France .................. 78 31023

[51] Int. Cl.³ .......................................... G05B 19/40
[52] U.S. Cl. ..................................... 318/696; 318/685
[58] Field of Search ............... 318/696, 685, 138, 254

[56] References Cited

U.S. PATENT DOCUMENTS

| | | |
|---|---|---|
| 3,824,440 | 1/1974 | McIntosh . |
| 3,886,459 | 5/1975 | Hufford et al. ............ 318/696 X |
| 3,968,416 | 7/1976 | Leenhouts . |
| 4,044,291 | 8/1977 | Hughes et al. ............ 318/696 |
| 4,087,732 | 5/1978 | Pritchard . |
| 4,156,170 | 5/1979 | Strunc ..................... 318/696 |
| 4,172,990 | 10/1979 | Everett et al. ............. 318/696 X |

FOREIGN PATENT DOCUMENTS

| | | |
|---|---|---|
| 2361003 | 7/1973 | Fed. Rep. of Germany . |
| 6943657 | 12/1969 | France . |
| 7240342 | 12/1972 | France . |
| 7322033 | 7/1973 | France . |
| 7509379 | 3/1975 | France . |

Primary Examiner—B. Dobeck
Attorney, Agent, or Firm—Mason, Kolehmainen, Rathburn & Wyss

[57] ABSTRACT

In a stepping motor (M), the windings (L1 to L4) can be switched with the aid of switches (111 to 114). Two windings of each pair (e.g. L1 and L2) cannot be brought into the circuit simultaneously and are together arranged in series with a resistor (146) and a transistor circuit (150) adapted to cut off the supply voltage of 25 volts. A comparison and control circuit (130) compares the winding current from the resistor (146) with a reference value which is determined by a digital balancing resistor network (120) controlled by a permanent memory (102) and consequently acts on the form factor of the interruptions of the 25 volt supply current by the transistor circuit (150). The invention enables the multiplication of the number of steps per revolution which can be carried out by a stepping motor.

6 Claims, 4 Drawing Figures

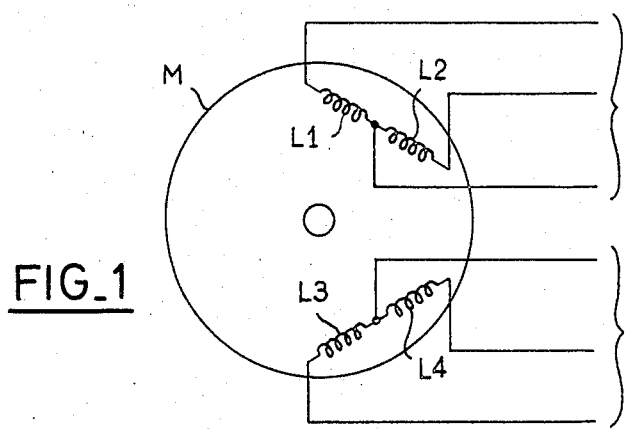
FIG_1
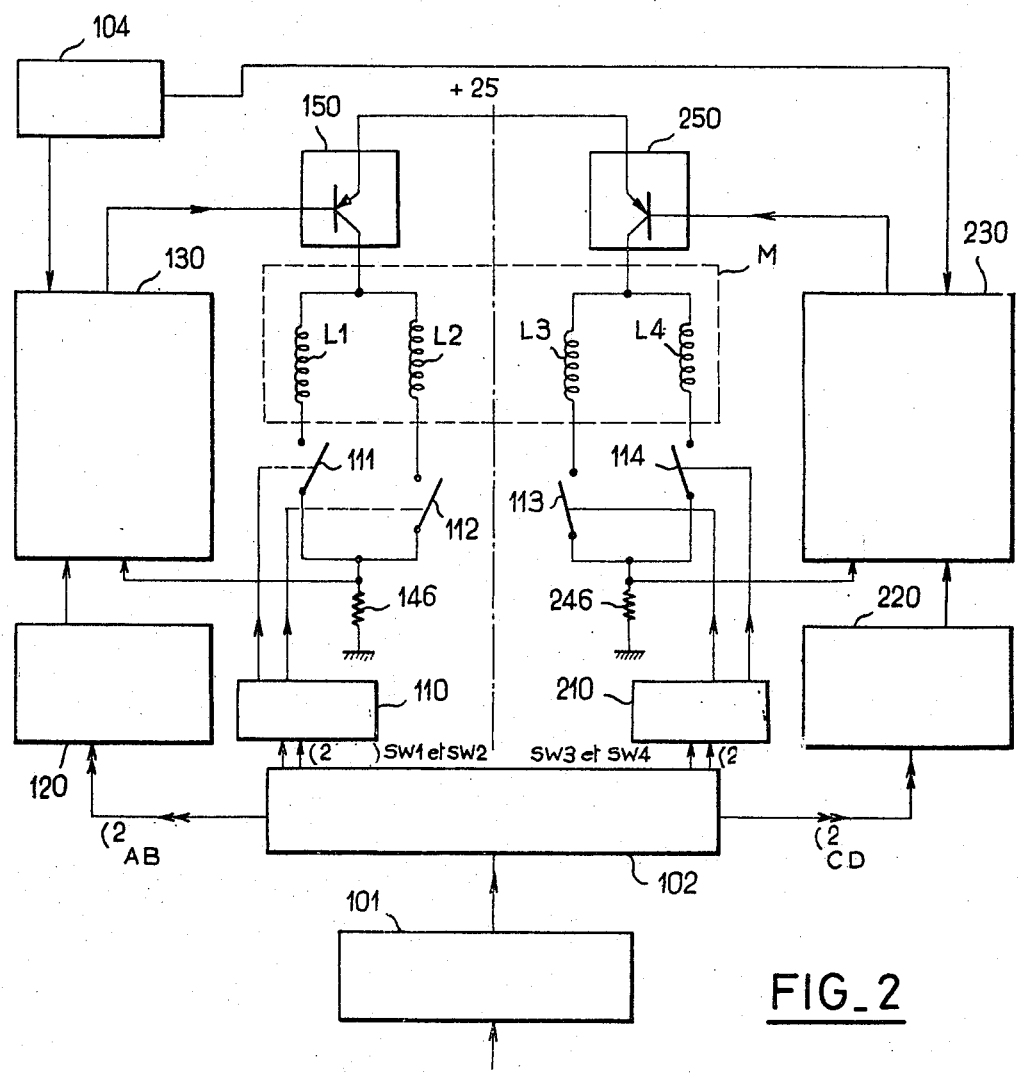
FIG_2

|  | 110 | | 210 | | 120 | | 220 | |
|---|---|---|---|---|---|---|---|---|
| 101 | SW1 | SW2 | SW3 | SW4 | A | B | C | D |
| 1 | 1 | 0 | 1 | 0 | 1 | 1 | 1 | 1 |
| 2 | 1 | 0 | 1 | 0 | 1 | 1 | 0 | 1 |
| 3 | 1 | 0 | 1 | 0 | 1 | 1 | 1 | 0 |
| 4 | 1 | 0 | 0 | 0 | 1 | 1 | 0 | 0 |
| 5 | 1 | 0 | 0 | 1 | 1 | 1 | 1 | 0 |
| 6 | 1 | 0 | 0 | 1 | 1 | 1 | 0 | 1 |
| 7 | 1 | 0 | 0 | 1 | 1 | 1 | 1 | 1 |
| 8 | 1 | 0 | 0 | 1 | 0 | 1 | 1 | 1 |
| 9 | 1 | 0 | 0 | 1 | 1 | 0 | 1 | 1 |
| 10 | 0 | 0 | 0 | 1 | 0 | 0 | 1 | 1 |
| 11 | 0 | 1 | 0 | 1 | 1 | 0 | 1 | 1 |
| 12 | 0 | 1 | 0 | 1 | 0 | 1 | 1 | 1 |
| 13 | 0 | 1 | 0 | 1 | 1 | 1 | 1 | 1 |
| 14 | 0 | 1 | 0 | 1 | 1 | 1 | 0 | 1 |
| 15 | 0 | 1 | 0 | 1 | 1 | 1 | 1 | 0 |
| 16 | 0 | 1 | 0 | 0 | 1 | 1 | 0 | 0 |
| 17 | 0 | 1 | 1 | 0 | 1 | 1 | 1 | 0 |
| 18 | 0 | 1 | 1 | 0 | 1 | 1 | 0 | 1 |
| 19 | 0 | 1 | 1 | 0 | 1 | 1 | 1 | 1 |
| 20 | 0 | 1 | 1 | 0 | 0 | 1 | 1 | 1 |
| 21 | 0 | 1 | 1 | 0 | 1 | 0 | 1 | 1 |
| 22 | 0 | 0 | 1 | 0 | 0 | 0 | 1 | 1 |
| 23 | 1 | 0 | 1 | 0 | 1 | 0 | 1 | 1 |
| 24 | 1 | 0 | 1 | 0 | 0 | 1 | 1 | 1 |
| 1 | 1 | 0 | 1 | 0 | 1 | 1 | 1 | 1 |

FIG_3

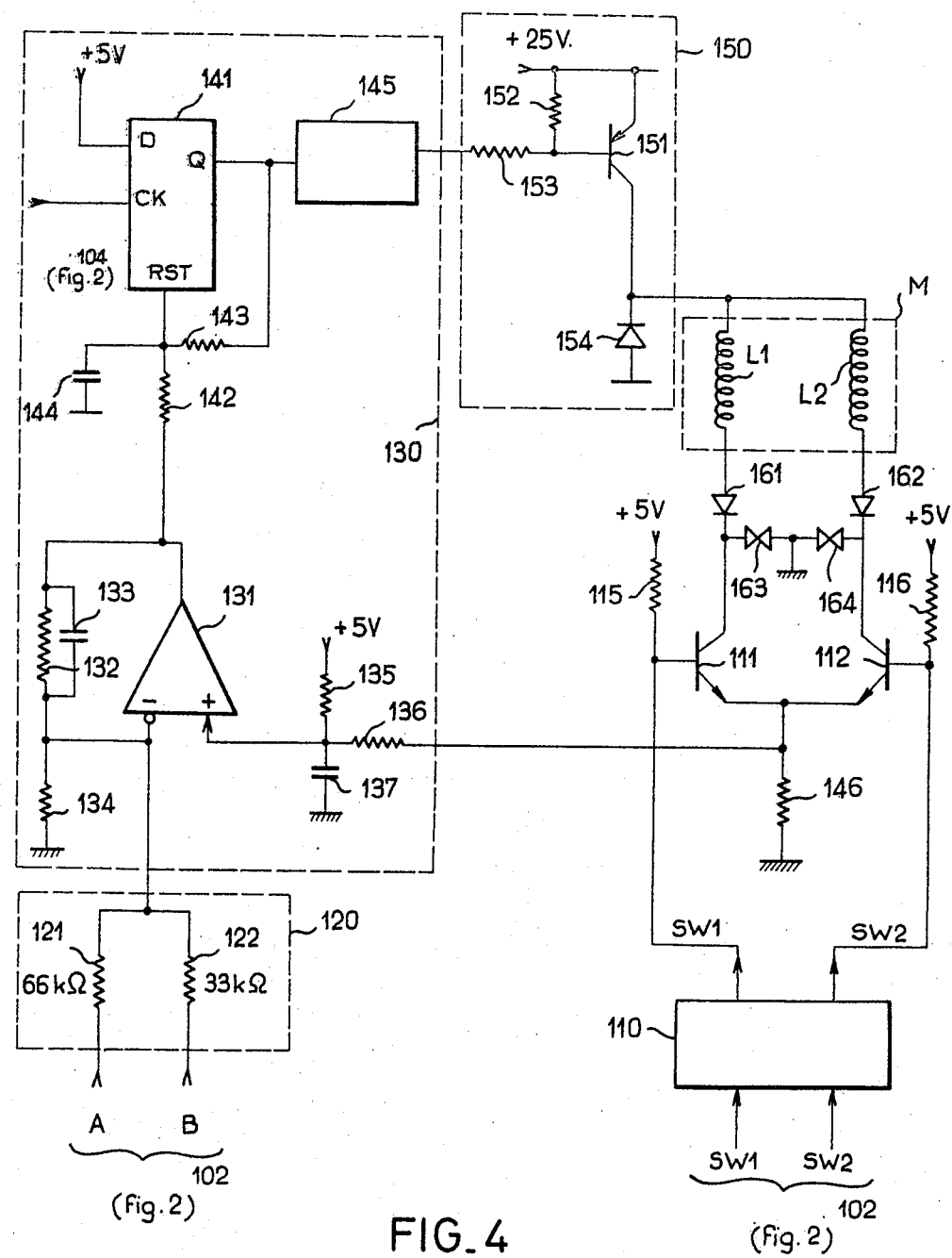
FIG_4

STEPPING MOTOR CONTROL APPARATUS

BACKGROUND OF THE INVENTION

The present invention relates to stepping motors.

Stepping motors are well known and are usually controlled with the aid of supply circuits which, when actuated, are capable of applying electric currents to the individual windings of the stepping motor, and with the aid of a selection circuit adapted to respond to the control signal by selectively actuating the supply circuits in accordance with a pre-established correspondance to the control signal. For example, in the case of a motor comprising four windings, the control sequence of four consecutive steps may be 1 0 1 0, 1 0 0 1, 0 1 0 1, and 0 1 1 0, the following sequence again being identical to the first, namely: 1 0 1 0. The binary digits are here associated in order with the different motor windings, and the digit 1 indicates, for example, that a winding is brought into the circuit, whereas the digit 0 indicates that the same winding is cut out of the circuit. Motors are known which, because of their construction, are capable of subdividing one revolution into 200 steps, thus repeating the control sequence just described 50 times.

It will be noted that, in the above control sequence, two windings are always connected in circuit at the same time. A control sequence of eight steps can be achieved in which, for some of the steps, a single winding is connected in the circuit. This results in a reduction in the movement of the motor, which is then capable of 400 steps per revolution.

Of great interest because of their precise movement, stepping motors nevertheless suffer from the discontinuous nature of their movement, which is troublesome in certain applications. It results in mechanical noise as well as troublesome vibrations, particularly in hydraulic applications where the stepping motor controls a pump, for example.

SUMMARY OF THE INVENTION

The present invention has as an object to remedy these disadvantages by enabling a multiplication of the number of steps that a stepping motor can execute per revolution.

According to one essential feature of the invention, the stepping motor is provided with supply circuits capable of introducing into the individual windings of the stepping motor a current controlled in accordance with a reference value, and the selection circuit is designed to determine not only the selection of the windings energized at each step, but also a gradation in the control of the current through each individual winding. Thus, the number of steps carried out at each revolution by the stepping motor is multiplied.

The supply circuits are preferably capable of applying to the individual windings of the stepping motor a voltage which is periodically cut off, which has a predetermined repetition rate and which has a form factor defined by comparison of the current passing through each winding with the reference value.

Very advantageously, the supply circuits comprise a common clock or timer which defines the predetermined repetition rates. By arranging for this repetition rate to be outside the audible frequencies, the electrical noise of the stepping motor is suppressed.

In a preferred embodiment of the invention, the selection circuit comprises controllable digital means such as a counter having a predetermined number of different states, permanent memory means, adapted to associate with each state of the digital means, firstly, first digital signals the number of which equals that of the motor windings and secondly, second digital signals, switch means coupled in series with each individual winding of the stepping motor and controlled by a respective signal of the first digital signals, and at least one digital balancing network controlled by the second digital signals, this network determining the gradation of the current in the individual windings.

Thus, according to one feature of the present invention, the above-mentioned gradation occurs cyclically to produce a gradual transition of the current applied to each of the windings of the stepping motor, instead of the sudden transition occurring in normal control, the number of steps per revolution being multiplied by the number of degrees of the said transition.

BRIEF DESCRIPTION OF THE DRAWINGS

Other features and advantages of the invention will emerge from consideration of the following detailed description taken with reference to the drawings and providing a preferred but non-limiting embodiment of the invention. In the drawings:

FIG. 1 shows a conventional stepping motor;

FIG. 2 is a diagram illustrating the principle of the control circuit for a stepping motor in accordance with the present invention;

FIG. 3 is a table showing the contents of the permanent memory 102 of FIG. 2 in this preferred embodiment; and FIG. 4 is a detailed block diagram showing part of the control circuit of FIG. 2.

DETAILED DESCRIPTION OF THE PREFERRED EMBODIMENT

FIG. 1 illustrates a stepping motor having four windings L1 to L4 and six outputs, such as the SLO-SYN motor (Registered Trade Mark) MO91-FD06, manufactured by the American Company, SUPERIOR ELECTRIC.

In FIG. 2, the four windings L1 to L4 of this motor M are shown in the central broken-line rectangle.

In the known manner, a switch member is associated with each individual winding of the motor; thus, the switch member 111 is associated with the winding L1, 112 with the winding L2 and so on.

In the type of motor utilized, the windings L1 and L2 are never connected in circuit together, and the same applies as regards the windings L3 and L4. It will be seen from FIG. 2 that the switches 111 and 112, which can connect the windings L1 and L2 into circuit, are jointly connected to a resistor 146 leading to earth. Since the two windings L1 and L2 are not brought into service at the same time, the current passing through the resistor 146 is representative of the current in the winding that is connected into the circuit; in the same way, the voltage developed across the resistor 146 is representative of this same current. The same obviously applies as regards the resistor 246 and windings L3 and L4 of the stepping motor M.

At the other end, the windings L1 and L2 are also jointly connected to a transistor circuit 150 which permits a supply voltage of 25 volts to be applied to one or other of the windings L1 and L2. The function of this circuit 150 will be explained in detail hereinafter. In a symmetrical arrangement, a transistor circuit 250 is likewise provided for the windings L3 and L4 of the motor M.

In accordance with the present invention, the signal for the stepwise advance of the motor is first applied to a submultiple step counter which is designated by the reference numeral 101 and which, in this example, has 24 different states, which can be achieved with five bits and a suitable coupling between the output of the counter and its input. It will be understood that this counter could be replaced by any other device having 24 different states, e.g. a shift register, or a register formed with the aid of a micro-processor.

For each of the 24 steps of the counter 101, a permanent memory 102, which may be programmable or of the pROM type, brings into correspondence a plurality of binary digital signals—in this case eight bits. The table of FIG. 3 shows this correspondence and forms part of the present description. The first column of the table illustrates the state of the counter 101. The two following columns SW1 and SW2 show the two bits which are applied to a circuit 110 controlling the switches 111 and 112 respectively, and placing them in the closed (conductive) state if the bit has the value of 1, or in the open state if the bit has the value of 0. The following two columns show, in a similar manner, the inputs of the circuit 210 which control the switches 113 and 114. The next two columns contain two bits A and B which control a first digital balancing resistor network 120. Finally, the two last columns of the table indicate two bits C and D which control a second digital balancing resistor network 220.

FIG. 2 further shows a first comparison and winding current control circuit 130, which controls the transistor circuit 150, and also a second comparison and winding current control circuit 230 which controls the transistor circuit 250. The inputs of the first comparison and control circuit 130 are supplied, on the one hand, with the output from the first digital balancing resistor circuit 120, and, on the other hand, with the voltage developed across the resistor 146 by the current passing through one or other of the windings L1 and L2. Similarly, the inputs to the second comparison and control circuit 230 are determined by the output from the second digital balancing resistor circuit 220 and by the voltage developed across the resistor 246 by the current passing through one or other of the windings L3 and L4 of the stepping motor.

A vertical broken line divides the elements of FIG. 2 into two halves, apart from the counter 101 and the permanent memory 102. The elements located to the left of this broken line will now be described with reference to FIG. 4.

This FIG. 4 shows the windings L1 and L2 of the motor M. The upper terminal, common to the windings L1 and L2, is connected to the cathode of a diode 154, the anode of which is grounded. The lower terminal of the winding L1 is connected to the anode of a diode 161, the cathode of which is grounded by way of a clipping device 163. Similarly, the lower terminal of the winding L2 is connected to the anode of a diode 162, the cathode of which is grounded by way of a clipper 164. The elements 154 and 161 to 164 are used for the purpose of protecting circuits surrounding the two individual windings against excess voltages and excess current density which may occur therein when switching takes place.

In FIG. 4, the switch 111 is formed by a transistor of the NPN type, the collector of which is connected to the cathode of the above-mentioned diode 161, and the emitter of which is connected to the common resistor 146. The other switch 112, associated with the winding L2, is constituted in the same way. The signals SW1 and SW2 emanating from the permanent memory 102 are applied to a circuit 110 which controls the bases of the transistors 111 and 112. In this example, the circuit 110 takes the form of a double power gate, the bases of the two transistors 111 and 112 being connected to the +5 volt line by resistor 115 and 116 respectively. In practice, double power gates often comprise a logic inversion. It will be understood that in such a case the effective contents of the permanent memory 102 are equal to the complement of the binary digital values indicated in the first four columns of the table in FIG. 3.

Thus, the state of the switches 111 and 112 is determined in accordance with the binary signals delivered by the outputs SW1 and SW2 of the permanent memory. The same will apply as regards the condition of the switches 113 and 114 which is determined by a circuit similar to that of FIG. 4, and specifically shown as block 210 of FIG. 2.

Still referring to FIG. 4, the outputs A and B of the permanent memory 102 are applied to two resistors 121 and 122 respectively, the other terminals of which are coupled together to form a current-summation junction. In this example, the resistor 121 has a rating of 66 kilohms, and the resistor 122 one of 33 kilohms. Thus, if the two bits A and B are at zero, a zero current is applied to the inversion input of the comparator 131. If only the bit A is at 1, a current i is applied to this same inversion input. If only the bit B is at 1, a current 2i is applied to the inversion input. Finally, if both the bits A and B are at 1, a current 3i is applied to the inversion input of the comparator 131.

The inversion input of this comparator 131 is connected to its output by way of a negative feedback and filtering network constituted by a resistor 132 and capacitor 133, and this same inversion input is connected to ground through a resistor 134. The rating of the resistor 134 is well below that of the resistors 121 and 122 and is one kilohm for example, in the present case. The rating of the resistor 132, on the other hand, is well above that of the resistors 121 and 122 and in the present case is 120 kilohms for example.

The non-inversion input of the comparator 131 receives the voltage across the resistor 146 through a filtering network formed by series resistor 136, capacitor 137 connected to ground, and resistor 135 connected to the +5 volts line. It will be seen that the output from the comparator 131 will indicate the fact that the current in one of the windings L1 and L2, and defined by the voltage across resistor 146, which is 0.1 ohm for example, is greater than or less than a reference value. This reference value is defined by the voltage applied to the other input of the comparator and takes account of the variation in the current summation by the resistors 121 and 122, the current being taken across the 1 kilohm resistor 134. When the current in the winding that is connected in circuit reaches the reference value, the comparator 131 acts, by way of a resistor 142, on the reset input of a D-type bistable 141. The reset input is protected in the normal manner against unintentional actuation by a capacitor 144 connected to ground. It is also connected to the Q output of the bistable by a resistor 143 which prevents unintentional resetting of the bistable. It will be noted that the D input of the bistable receives a voltage of +5 volts, that is to say, a logic signal 1, and this causes the bistable 141 to react to a signal from a common clock that arrives at its CK input from the circuit 104 of FIG. 2.

The Q output of the bistable 141 is connected to a gate 145 which, by way of a resistor 153, controls the base of a power transistor 151 of the PNP type, which forms the essentials of the circuit 150. The base of the said transistor 151 is connected to the +25 volt line by a resistor 152, and the emitter of the same transistor is connected directly to the +25 volt line. Finally, the collector of the transistor 151 controls the common junction of the windings L1 and L2, being thus connected to the cathode of the diode 154.

The mode of operation is as follows.

The leading edge of each of the clock signals that is applied to the CK input of the bistable 141 renders the transistor 151 conductive, and this applies the voltage of +25 volts to one of the terminals of one of the windings L1 and L2, following which the transistor 111 or 112 is in the conductive state so as to be controlled by the previously mentioned signals SW1 and SW2. The current in the winding concerned rises rapidly, and with it, the voltage across the resistor 146. When the latter reaches the reference value, the output of the comparator 131 resets the bistable 141 and this causes the transistor 151 to cease to conduct. The current in the winding concerned then decreses. This decrease continues until the arrival of the next leading edge of the clock pulses which returns the transistor 151 to its conductive state, so that the current is applied to the winding L1 at a value equal to that determined by the reference resistor network 120. This mode of operation continues, the current fluctuating slightly below the value determined by the digital balancing reference network 120. The clock frequency is of course selected at a sufficiently high level to prevent the amplitude of the oscillations from being too great. This mode of operation takes place until there is a change in the state of the digital signals A, B and SW1, SW2, i.e. until the main counter 101 shown in FIG. 2 passes into another state, indicating that it is required to run the stepping motor forward.

The mode of operation is, of course, exactly the same for the two outer windings L3 and L4 which are controlled on the basis of digital signals SW3 and SW4 and C and D provided by the outputs of the permanent memory 102 shown in FIG. 2.

The following table shows how the motor described could be controlled with the aid of a sequence of eight steps, permittingg 400 steps per revolution:

|   | SW1 | SW2 | SW3 | SW4 |
|---|---|---|---|---|
| 1 | 1 | 0 | 1 | 0 |
| 2 | 1 | 0 | 0 | 0 |
| 3 | 1 | 0 | 0 | 1 |
| 4 | 0 | 0 | 0 | 1 |
| 5 | 0 | 1 | 0 | 1 |
| 6 | 0 | 1 | 0 | 0 |
| 7 | 0 | 1 | 1 | 0 |
| 8 | 0 | 0 | 1 | 0 |
| 1 | 1 | 0 | 1 | 0 |

It will be seen that the eight control steps used in the earlier technique correspond respectively to the steps 1, 4, 7, 10, 13, 16, 19 and 22 of the control table for the stepping motor in accordance with the invention as illustrated in FIG. 3. It will be observed that in this case the inputs A and B as well as C and D are always in the same condition, namely 1 if the pair of windings concerned are passing a current, and 0 if it is passing no current.

Examining the situation as regards the states 2 and 3 of the counter 101, it will be seen that at state 2 only the input B is at 1, and this indicates that the current will not be at its full value but will be determined solely by the 33 kilohm resistor associated with it; for state 3 of the counter 101 on the other hand, the single 66 kilohm resistor will determine the current passing through the winding L3.

Referring now to the states 23 and 24, the same thing is observed but this time for the winding L1, which is sucessively controlled as regards the current value defined by the 66 kilohm resistor 121 in FIG. 4, and then by the current defined by the 33 kilohm resistor 122 in this same Figure.

The right-hand portion of FIG. 3 shows, from top to bottom, the development of the current L1, in solid lines, and the development of the current L2, in broken lines, as a function of the states 1 to 24 of the counter 101. This illustration does not take into account small variations in the current due to the fluctuations in the frequency of the common clock and in the comparison.

The development of the current in the winding L4 is the same as that of the current in the winding L1 but is displaced six steps forward on the counter. Finally, the development of the current in the winding L3 is the same as that of the current in the winding L2, with the same exception that it is displaced forwardly by six steps on the counter 101.

Examination of the table in FIG. 3 shows that to each of the stages provided by the control of the motor in accordance with prior techniques, to stage 1 for example, there are added two stages in accordance with the invention, for example the states 2 and 3 of the counter 101. Thus, the total number of steps through which a revolution of the stepping motor can be controlled now rises to 1200 instead of the 400 steps provided by the control method having a sequence of eight steps.

The number of steps is not of course limited. It is possible to obtain a still greater number of steps per revolution by using more than two resistors in the current-summation junction formed by the circuits 120 and 220. It is obviously of advantage to increase correspondingly the capacity of the permanent memory 102 and to fill it in a suitable manner.

Nor is the present invention limited to the type of stepping motor described, i.e. a motor which contains two pairs of windings and in which a single winding of each pair can be connected into the circuit simultaneously. In the case of motors wherein it would be possible to connect each of the windings into the circuit individually, a control signal of two bits, such as A and B, would be provided not only for the winding L1 but also for the winding L2.

Furthermore, the present invention is not limited to the embodiment described, but covers all variants encompassed by the spirit of the invention. As previously indicated, it is possible to replace the counter 101 by any member having 24 different steps (or another number of steps depending upon the mode of application). For certain applications, use can be advantageously made of a microprocessor.

Similarly, although at present it is considered preferable that all the circuits for controlling the winding current should function with switching of the voltage applied to the windings, starting from a predetermined and common recurrence frequency, and on the basis of a comparison with a reference value, it is also possible to envisage that the recurrence frequencies are determined independently for each of the windings which then operates in an asynchronous manner. More generally, it is also possible to envisage variants of the present invention wherein the current passing through the windings is determined in a manner other than by cutting off the voltage applied to the windings.

What is claimed is:

1. In an apparatus for controlling a stepping motor having its windings grouped by pairs while two windings of the same pair cannot be supplied simultaneously, said apparatus comprising means receiving a control signal, supply circuits adapted to controllably feed the individual windings of the stepping motor with respective electric currents, and a selection circuit adapted to selectively actuate the supply circuits depending upon said control signal, and adapted to further define an indication of gradation of the control current of each winding in accordance with the control signal, the improvement comprising a resistor associated with each pair of windings and a pair of switch means respectively arranged between one end of the two windings of a pair thereof and the associated resistor, said supply circuits feed in common the other end of the two windings of a respective pair thereof, with a current, the amplitude of which is defined by said indication of gradation and the fed current energizing the one of said windings being selected by said switch means.

2. Apparatus for controlling a stepping motor according to claim 1, in which the supply circuits comprises a common clock which predetermines the repetition rate of the voltage, periodically cut off, which is applied to the individual windings of the stepping motor by the supply circuits.

3. Apparatus for controlling a stepping motor according to claim 1, in which said selection circuit comprises:
controllable digital means having a predetermined number of different states,
permanent memory means adapted to associate, with each state of the digital means, first digital signals, the number of which equals that of the motor windings, and second digital signals,
switch means coupled in series with each individual winding of the stepping motor and controlled by the respective one of the first digital signals, and
at least one digital balancing network, controlled by the second digital signals, this network determining the gradation of the current in the individual windings.

4. Apparatus for controlling a stepping motor according to claim 3, in which the digital means having a predetermined number of different states comprises a counter.

5. Apparatus for controlling a stepping motor according to claim 3, in which each winding switch unit is in series with a resistor, the voltage across the resistor representing the current passing through the winding.

6. Apparatus for controlling a stepping motor according to claim 5, in which the supply circuits comprise a comparator receiving, on the one hand, the voltage across the resistor and, on the other hand, a gradation of the required value of the winding current, and supply means connected to the output of the comparator to supply the winding concerned so as to maintain the actual winding current at substantially the required value.

* * * * *